(12) United States Patent
Hoshi (10) Patent No.: US 9,776,541 B2
(45) Date of Patent: Oct. 3, 2017

(54) VEHICLE SEAT

(71) Applicant: TS TECH CO., LTD., Asaka-shi, Saitama (JP)

(72) Inventor: Yuichiro Hoshi, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 15/027,806

(22) PCT Filed: Oct. 9, 2014

(86) PCT No.: PCT/JP2014/077092
§ 371 (c)(1),
(2) Date: Apr. 7, 2016

(87) PCT Pub. No.: WO2015/053370
PCT Pub. Date: Apr. 16, 2015

(65) Prior Publication Data
US 2016/0236598 A1    Aug. 18, 2016

(30) Foreign Application Priority Data

Oct. 10, 2013 (JP) ................................ 2013-212690

(51) Int. Cl.
*A47C 7/74* (2006.01)
*B60N 2/56* (2006.01)

(52) U.S. Cl.
CPC ......... *B60N 2/5657* (2013.01); *B60N 2/5685* (2013.01)

(58) Field of Classification Search
CPC ............................ B60N 2/5685; B60N 2/5657
USPC ......................................... 297/180.1, 180.12
See application file for complete search history.

(56) References Cited

U.S. PATENT DOCUMENTS

| 7,205,510 | B2* | 4/2007 | Howick | B60N 2/5685 |
| | | | | 297/180.12 X |
| 7,244,914 | B2* | 7/2007 | Yoneyama | H05B 3/34 |
| | | | | 297/180.12 X |
| 7,452,028 | B2* | 11/2008 | Knoll | A47C 7/74 |
| | | | | 297/180.1 |
| 7,731,279 | B2* | 6/2010 | Asada | B60N 2/448 |
| | | | | 297/180.12 |
| 2003/0213797 | A1 | 11/2003 | Yoneyama et al. | |
| 2005/0093346 | A1* | 5/2005 | Witchie | B60N 2/5628 |
| | | | | 297/180.1 |

(Continued)

FOREIGN PATENT DOCUMENTS

| JP | 2006-081575 A | 3/2006 |
| JP | 2007-209397 A | 8/2007 |
| JP | 3991750 B2 | 10/2007 |

*Primary Examiner* — Rodney B White
(74) *Attorney, Agent, or Firm* — Drinker Biddle & Reath LLP (57) ABSTRACT

A vehicle seat capable of efficiently utilizing air delivered from an air conditioning device and thereby adjusting the temperature of heat generated by a seat heater is described. A vehicle seat comprises a seat heater between a cushion pad and a surface skin. A heater wire affixed to a seat base material of the seat heater is disposed at a position to partially overlap air passages formed on the cushion pad. Moreover, the heater wire is formed on the seat base material, is disposed at a position to partially overlap a plurality of through-holes having a greater width than the heater wire, and extends while avoiding center portions of the through-holes.

7 Claims, 6 Drawing Sheets

(56) References Cited

U.S. PATENT DOCUMENTS

| | | | |
|---|---|---|---|
| 2007/0013213 A1* | 1/2007 | Axinte | A47C 4/52 297/180.12 |
| 2007/0158981 A1* | 7/2007 | Almasi | A47C 7/74 297/180.12 |
| 2007/0246456 A1 | 10/2007 | Yoneyama et al. | |
| 2009/0095725 A1* | 4/2009 | Ohashi | B60N 2/5685 297/180.12 X |
| 2012/0049586 A1* | 3/2012 | Yoshimoto | A47C 7/748 297/180.12 |
| 2013/0097777 A1* | 4/2013 | Marquette | A47C 7/74 297/180.12 X |
| 2013/0106147 A1* | 5/2013 | Lazanja | B60N 2/5685 297/180.12 |
| 2015/0266405 A1* | 9/2015 | Fitzpatrick | B60N 2/5685 297/180.12 |
| 2015/0274049 A1* | 10/2015 | Langensiepen | B60N 2/5628 297/180.12 |
| 2016/0009206 A1* | 1/2016 | Perraut | B60N 2/5635 297/180.12 |

* cited by examiner

VEHICLE SEAT

CROSS-REFERENCE TO RELATED APPLICATIONS

This application is a National Stage Entry application of PCT Application No. PCT/JP2014/077092, filed Oct. 9, 2014, which claims the priority benefit of Japanese Patent Application No. 2013-212690, filed on Oct. 10, 2013, the contents being incorporated herein by reference.

BACKGROUND

The present disclosure relates to a vehicle seat, and particularly to a vehicle seat including a seat heater disposed in a seat cushion and a seat back.

Hitherto, in vehicle seats, various techniques of disposing a seat heater made of a planar heating element between a cushion pad and a surface skin and thereby ensuring comfort when an occupant is seated have been proposed. Moreover, as one of several techniques for further improving seating comfort, configuring a vehicle seat to perform cooling and heating also using an air conditioning device has been put into practice. Specifically, warm air or cool air is delivered from the air conditioning device through air passages formed in the cushion pad toward a surface skin side while the seat heater and the surface skin are allowed to be air permeable, so that air blows out from an outer surface of the vehicle seat.

As an example of such vehicle seats, Japanese Patent Publication JP 3991750 B2 (hereinafter, "the '750 publication") discloses a vehicle seat including a seat heater made of a planar heating element having an improved air permeability. Specifically, the seat heater is formed by fixing a heater wire sewn on a seat base material made of a non-woven fabric, and on the seat base material, through-holes are formed over the entire surface while avoiding a position at which the heater wire is fixed. Air permeability of the seat heater is ensured as described above, whereby air delivered from the air conditioning device can pass from a cushion pad side toward the surface skin side.

However, in the vehicle seat as in the '750 publication, the heater wire is disposed to avoid the through-holes on the seat base material which would inhibit air delivered from the air conditioning device through the through-holes from efficiently cooling the heater wire. Moreover, the degree of freedom of disposition of the heater wire has been restricted. Thus, a vehicle seat capable of efficiently utilizing air delivered from an air conditioning device and thereby adjusting the temperature of heat generated by a seat heater has been desired. At the same time, a vehicle seat including a seat heater in which the degree of freedom of disposition of the heater wire is ensured has been desired.

Moreover, in the vehicle seat as in the '750 publication, the arrangement and configuration of the air passages formed in the cushion pad, and of the through-holes and the heater wire that are provided to the seat heater have not been particularly considered. Thus, a vehicle seat in which the arrangement and configuration of the air passages of the cushion pad and the seat heater have been considered has been desired.

SUMMARY

The present disclosure has been made in view of the problem as described above, and an object of an embodiment of the present disclosure is to provide a vehicle seat capable of efficiently utilizing air delivered from an air conditioning device and thereby adjusting the temperature of heat generated by a seat heater. Another object of an embodiment of the present disclosure is to provide a vehicle seat including a seat heater in which the degree of freedom of disposition of a heater wire is ensured. Another object of an embodiment of the present disclosure is to provide a vehicle seat in which the arrangement and configuration of air passages provided to a cushion pad, and a seat heater are considered.

At least some problems as described above are solved by an embodiment of a vehicle seat of the present disclosure including a cushion pad, a surface skin that covers the cushion pad, and a seat heater disposed between the cushion pad and the surface skin, the vehicle seat being configured to allow air to be delivered from a side of the cushion pad toward a side of the surface skin through an air passage formed in the cushion pad, in which the seat heater includes a seat base material that comprises a planar element, and a heater wire fixed on the seat base material, the seat base material has a plurality of through-holes that extend from a first surface side to a second surface side opposite the first surface side, are formed to have a width less than the air passage, and are formed to have a width greater than the heater wire, and the heater wire is disposed at a position to partially overlap the air passage on the cushion pad, and is disposed at a position to partially overlap the plurality of through-holes on the seat base material and extends while avoiding center portions of the through-holes.

As described above, the heater wire is disposed at a position to partially overlap the air passages on the cushion pad, and is disposed at a position to partially overlap the plurality of through-holes on the seat base material, whereby air delivered from an air conditioning device through the air passages and the through-holes can be efficiently utilized and thereby the temperature of heat generated by the heater wire can be adjusted. Moreover, the seat base material has a plurality of through-holes where the through-holes are formed to have a width greater than the heater wire, and the heater wire is disposed at a position to partially overlap the plurality of through-holes on the seat base material, whereby the heater wire can be freely disposed without avoiding the plurality of through-holes on the seat base material. Moreover, the heater wire extends while avoiding center portions of the through-holes having a large width on the seat base material, whereby the heater wire can be disposed to avoid center portions of the through-holes that are positions at which the heater wire most easily sinks and deforms when a seating load of the occupant is applied, and deformation of the heater wire can be reduced.

In this embodiment, the through-holes comprise elongated holes, and the heater wire extends in a direction intersecting a longitudinal direction of the through-holes on the seat base material. Moreover, the heater wire extends to form an acute angle with respect to the longitudinal direction of the through-holes on the seat base material. Further, the heater wire extends in a direction orthogonal to the longitudinal direction of the through-holes on the seat base material. With the configuration as described above, deformation of the heater wire can be reduced while the seat heater is allowed to have a desired air permeability and the degree of freedom of disposition of the heater wire is ensured.

In this embodiment, the heater wire includes a bent portion that is bent, and the bent portion is disposed at a position to avoid the through-holes on the seat base material. With the configuration as described above, in the heater wire, the bent portion that is comparatively easy to deform is disposed at a position to avoid the through-holes, whereby deformation of the heater wire can be further reduced.

In this embodiment, the heater wire includes a straight line portion that linearly extends, and only the straight line portion is disposed at a position to overlap the through-holes on the seat base material. With the configuration as described above, in the heater wire, only the straight line portion that is comparatively difficult to deform is disposed at a position to overlap the through-holes, whereby deformation of the heater wire can be further reduced.

In this embodiment, the heater wire is disposed to extend over the through-holes on the seat base material, and includes a first overlapping portion and a second overlapping portion that are provided at positions to overlap an outer circumferential portion of the through-holes, and a bent portion provided at a position to overlap the through-holes and bent between the first overlapping portion and the second overlapping portion, and a distance of a perpendicular line from the bent portion with respect to an extension line of a straight line that connects the first overlapping portion and the second overlapping portion is shorter than a distance of a perpendicular line from a center portion of the through-holes with respect to the extension line. With the configuration as described above, even in a case in which the bent portion of the heater wire is disposed to overlap the through-holes, an overlapping portion of the bent portion and the periphery of the bent portion and the through-holes is generally as small as possible, whereby deformation of the heater wire can be further reduced.

According to an embodiment, air delivered from an air conditioning device through the air passages and the through-holes is more efficiently utilized and thereby the temperature of heat generated by the heater wire can be adjusted. Moreover, the heater wire can be freely disposed without avoiding the plurality of through-holes on the seat base material. Moreover, the heater wire can be disposed to avoid the center portions of the through-holes, which are positions at which the heater wire most easily sinks and deforms when a seating load of the occupant is applied, and deformation of the heater wire can be reduced.

According to an embodiment, deformation of the heater wire can be reduced while the seat heater is allowed to have a desired air permeability and the degree of freedom of disposition of the heater wire is ensured. According to an embodiment, in the heater wire, the bent portion that is comparatively easy to deform is disposed at a position to avoid the through-holes, whereby deformation of the heater wire can be further reduced.

According to an embodiment, in the heater wire, only the straight line portion that is comparatively difficult to deform is disposed at a position to overlap the through-holes, whereby deformation of the heater wire can be further reduced. According to an embodiment, even in a case in which the bent portion of the heater wire is disposed to overlap the through-holes, an overlapping portion of the bent portion and the periphery of the bent portion and the through-holes is generally as small as possible, whereby deformation of the heater wire can be further reduced.

DETAILED DESCRIPTION

Hereinafter, a vehicle seat according to various embodiments of the invention is described with reference to FIGS. 1-6. The embodiments relate to a vehicle seat provided with an air-permeable seat heater between a cushion pad and a surface skin, in which a heater wire affixed on a seat base material of the seat heater is disposed at a position to partially overlap air passages formed on the cushion pad, while formed on the seat base material, is disposed at a position to partially overlap a plurality of through-holes having a greater width than the heater wire, and extends while avoiding center portions of these through-holes. In the description herein, a side on which an occupant is seated with respect to a seat back of the vehicle seat is referred to as a seat front side.

Figure 1:
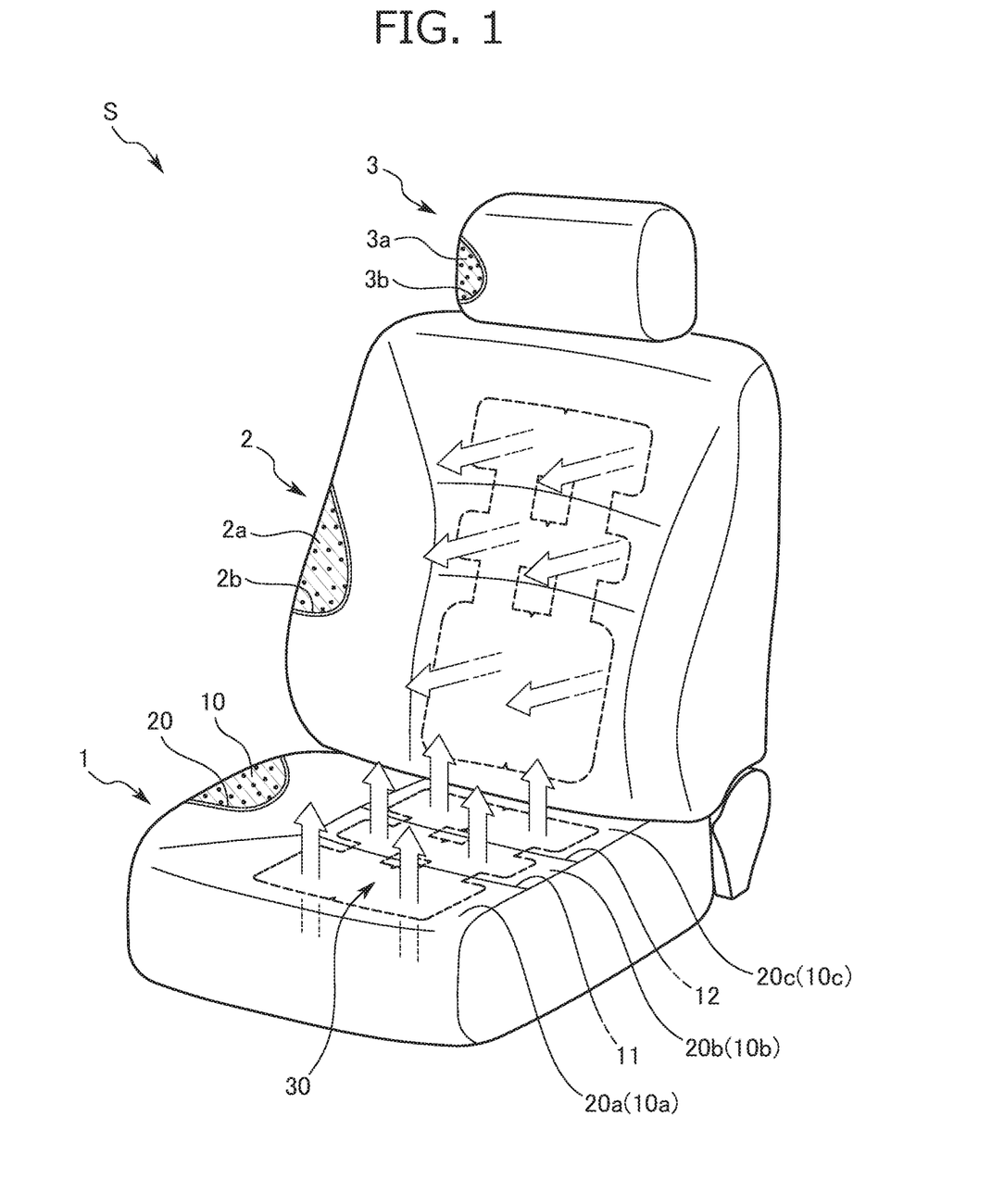
FIG. 1 is a schematic perspective view of a vehicle seat according to an embodiment.

As illustrated in FIG. 1, a vehicle seat S of the present embodiment comprises a seat cushion 1, a seat back 2 disposed on a back surface side of the seat cushion 1, and a head rest 3 disposed on a top surface side of the seat back 2.

The seat cushion 1 is a seating portion supporting the occupant from below, and is formed by placing a cushion pad 10 on a cushion frame (not shown) serving as a framework and by being covered with a surface skin 20. The seat back 2 is a backrest portion supporting the back of the occupant from behind, and is formed by placing a cushion pad 2a on a back frame (not shown) serving as a framework and by being covered with a surface skin 2b. The head rest 3 is a head portion supporting the head of the occupant from behind, and is formed by placing a cushion pad 3a on a pillar (not shown) serving as a core member and by being covered with a surface skin 3b. Moreover, the seat cushion 1 of the present embodiment includes a seat heater 30 between the cushion pad 10 and the surface skin 20. The seat back 2 includes a separate seat heater, similar to the seat heater 30.

Figure 2:
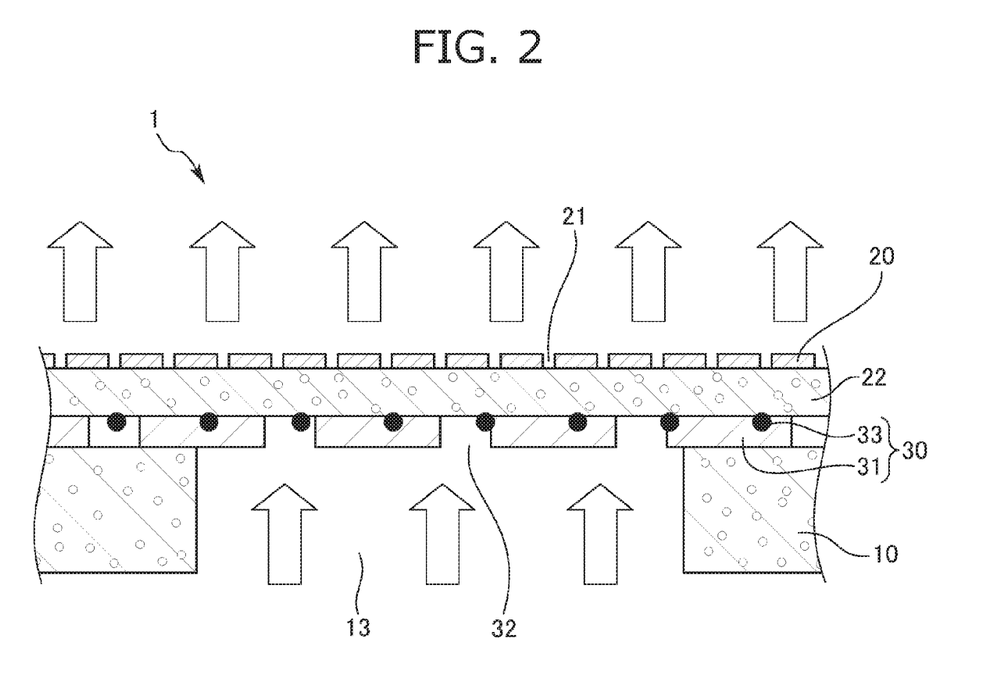
FIG. 2 is an illustrative view of a vertical cross section of a seat cushion of FIG. 1 as viewed from a seat right and left direction, according to an embodiment.

The cushion pad 10 is a pad member made of urethane foam or the like, and is formed integrally by a front pad 10a located on the seat front side, a center pad 10b located on a center side, and a back pad 10c located on a seat back side, as illustrated in FIG. 1. On a top surface of a substantially center portion of the cushion pad 10 in a seat front to back direction, pad grooves 11, 12 elongated in a seat right and left direction are formed. The pad grooves 11, 12 are substantially U-shaped in a vertical cross section, and arranged with a predetermined space in the seat front to back direction. The pad groove 11 partitions a top surface of the cushion pad 10 into the front pad 10a and the center pad 10b in the seat front to back direction, and the pad groove 12 partitions the top surface of the cushion pad 10 into the center pad 10b and the back pad 10c. At a substantially center portion of the cushion pad 10 in the seat right and left direction, air passages 13 that extend from a top surface side to a bottom surface side in a vertical direction are formed, as illustrated in FIG. 2.

The air passages 13 are made of through-holes that are substantially circular shaped in a horizontal cross section, and, for example, are passages that allow air delivered from a publicly known air conditioning device disposed below the seat cushion 1 to pass toward a side of the surface skin 20. The air passages 13 are formed according to a predetermined arrangement pattern, and, specifically, a plurality of air passages 13 are formed over the entirety of seating surfaces of the front pad 10a supporting the thighs of the occupant when the occupant is seated and of the center pad 10b supporting the buttocks of the occupant. The cushion pad 10 is formed from a pad member, such as urethane foam, and is generally air permeable, thereby being configured to allow air to generally pass through the cushion pad 10 other than through the air passages 13.

The surface skin 20 is made of a publicly known stretchable leather material or the like, and is formed into a shape configured to cover the cushion pad 10 from above. In the surface skin 20, a surface skin 20a, a surface skin 20b, and a surface skin 20c are integrally provided at positions corresponding to respective top surfaces of the front pad 10a, the center pad 10b, and the back pad 10c as illustrated in FIG. 1 in the seat front to back direction. The surface skin 20a and the surface skin 20b are sewn and connected together at a position corresponding to the pad groove 11. Similarly, the surface skin 20b and the surface skin 20c are also sewn and connected together at a position corresponding to the pad groove 12. At a substantially center portion of the surface skin 20 in the seat right and left direction while at positions corresponding to the air passages 13, a plurality of air passage holes 21 that extend from the top surface side to the bottom surface side in the vertical direction are formed, as illustrated in FIG. 2.

The air passage holes 21 are substantially circular shaped in the horizontal cross section, and are holes that allow air delivered from the air conditioning device through the air passages 13 to pass toward an occupant side. The air passage holes 21 are formed according to a predetermined arrangement pattern, and, specifically, a plurality of air passage holes 21 are formed over the entirety of seating surfaces of the surface skin 20a and the surface skin 20b. The air passage holes 21 are formed to have a width less than the air passages 13 on the cushion pad 10, and the plurality of the air passage holes 21 are arranged over a larger range in comparison with the air passages 13. Then, arrangement is made at positions to at least partially vertically overlap the air passages 13. Thus, air delivered from the air conditioning device through the air passages 13 can be efficiently delivered from the plurality of air passage holes 21 to the occupant side over a large range.

In the surface skin 20, at portions above the pad grooves 11, 12 while at positions at which the surface skin 20a, the surface skin 20b, and the surface skin 20c are each sewn, leading-in cloths (not shown) for leading the surface skin 20 into the pad grooves 11, 12 are attached. Moreover, in the interior of the cushion pad 10 while at portions below the pad grooves 11, 12, insert wires (not shown) having a substantially circular cross section elongated in the seat right and left direction are embedded. The surface skin 20 is fixed to a side of the cushion pad 10 by hooking the leading-in cloths to the insert wires through a C-ring (not shown) formed in a substantially C-like shape.

At a portion between the surface skin 20 and the cushion pad 10 and adjacent to the surface skin 20, a wadding member 22 is disposed, as illustrated in FIG. 2. The wadding member 22 is made of a urethane foam member stretchable as well as air permeable, or the like, and is integrally bonded to the surface skin 20. Air can pass from the side of the cushion pad 10 toward the side of the surface skin 20. The wadding member 22 is provided for ensuring comfort for the occupant, but may be omitted in some embodiments.

The seat heater 30 is a planar heating element for warming the seat cushion 1, and is disposed between the cushion pad 10 and the surface skin 20 in an up and down direction, as illustrated in FIG. 1. The seat heater 30 is disposed on the top surface of the cushion pad 10 at a substantially center portion in the seat right and left direction, and in an embodiment, is bonded through an adhesive agent or the like to the top surfaces of the front pad 10a supporting the thighs of the seated occupant, of the center pad 10b supporting the buttocks of the occupant, and of the back pad 10c. At a portion of the top surface of the cushion pad 10 at which the seat heater 30 is disposed, a heater mounting recessed portion (not shown) configured to house the seat heater 30 is formed, and consideration is made such that the seat heater 30 does not protrude toward a surface skin side when the seat heater 30 is mounted on the cushion pad 10.

Figure 3:
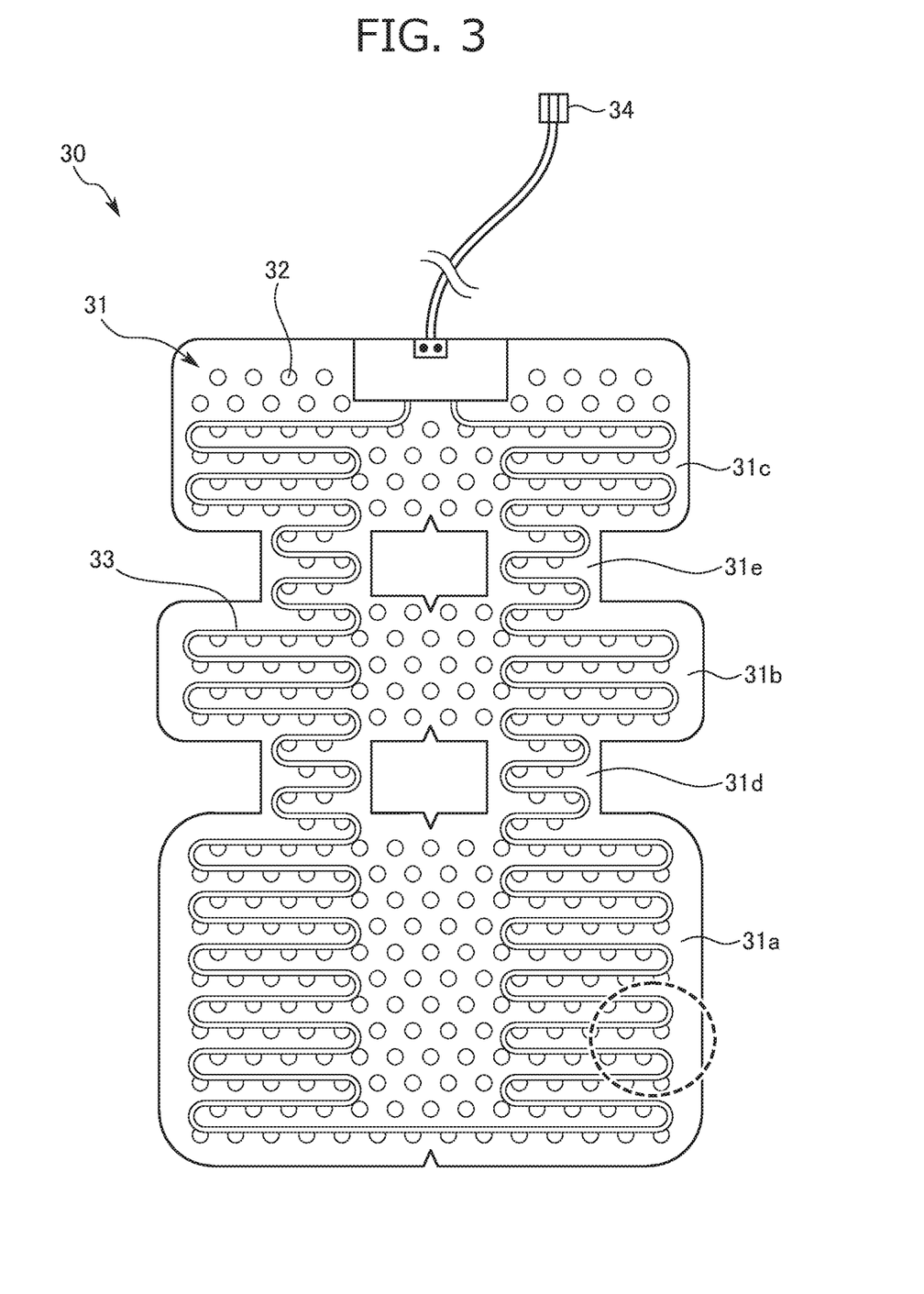
FIG. 3 is a plan view of a seat heater, according to an embodiment.

The seat heater 30 is mainly composed of a seat base material 31 made of a non-woven fabric with a porous structure using polyester fibers or the like, and a cord-shaped heater wire 33 bonded and fixed to the seat base material 31, as illustrated in FIG. 3. In an embodiment, on the seat base material 31, an extending end portion of the heater wire 33 is connected to a connector 34, and connected through the connector 34 to an electric system of a vehicle. In some embodiments, a publicly known temperature control device (not shown) or a publicly known seating sensor (not shown) that detects seating of the occupant is joined to a predetermined position on the seat base material 31. With such a configuration, whether or not the occupant is seated in the vehicle seat is correctly detected, and the seat cushion 1 can be warmed under a comfortable temperature control.

The seat base material 31 is made of a substantially rectangular planar element, and includes a front planar element 31a, a center planar element 31b, and a back planar element 31c that are respectively placed on the front pad 10a, the center pad 10b, and the back pad 10c and substantially rectangular, as illustrated in FIG. 3. Moreover, substantially rectangular connection planar elements 31d, 31e connecting these planar elements 31a, 31b, 31c to one another, a part of which is inserted into the interior of the pad grooves 11, 12 to be placed, are included. In an embodiment, the front planar element 31a and the center planar element 31b are connected through the two connection planar elements 31d provided with a space in the seat right and left direction. Similarly, the center planar element 31b and the back planar element 31c are connected through the two connection planar elements 31e. At the seat base material 31, as illustrated in FIG. 3, a plurality of through-holes 32 that extend from the top surface side to the bottom surface side in the vertical direction are formed.

At substantially center portions in the seat right and left direction, at front end portions and back end portions of the planar elements 31a, 31b, 31c, a substantially V-shaped notch portion for positioning with respect to the cushion pad 10 is formed. Thus, an operation of mounting the seat heater 30 becomes more efficient, and the seat heater 30 can be accurately mounted at a desired position. The notch portion is disposed using a space between two of the through-holes 32 that are arranged at a center portion in the seat right and left direction, and is arranged adjacent to these two through-holes 32.

The through-holes 32 are substantially circular shaped in the horizontal cross section, allow air delivered from the air conditioning device through the air passages 13 to pass toward the side of the surface skin 20, and are formed according to a predetermined arrangement pattern, over the entirety of a top surface of the seat base material 31. As illustrated in FIG. 2, the through-holes 32 are formed to have a width less than the air passages 13 on the cushion pad 10, and a plurality of the through-holes 32 are arranged over a larger range in comparison with the air passages 13. Arrangement of the plurality of through-holes 32 is made at positions which at least partially vertically overlap with the air passages 13. Moreover, the through-holes 32 are formed to have a width greater than the air passage holes 21 on the surface skin 20, and are arranged over a substantially identical range with respect to the air passage holes 21. Arrangement of the plurality of through-holes 32 is made at positions to at least partially vertically overlap the air passage holes 21. With the configuration as described above, air delivered from the air conditioning device through the air passages 13 can be more efficiently delivered from the through-holes 32 and the air passage holes 21 to the occupant side over a large range.

The heater wire 33 is a nichrome heating wire made of an elongated wire-shaped material having a substantially circular cross section, or the like, and is bonded and fixed on the seat base material 31 according to a predetermined arrangement pattern. As illustrated in FIG. 3, the heater wire 33 is configured by branching into two portions from a back end portion of the seat base material 31 and winds toward a seat front in such a manner as to be substantially parallel to each other, the two branched heater wires 33 being connected at a front portion of the seat base material 31.

As illustrated in FIG. 2, the heater wire 33 is formed to have a width less than the air passages 13 on the cushion pad 10, and is arranged to extend over a larger range in comparison with the air passages 13. Arrangement of the heater wire 33 is made at a position to at least partially vertically overlap the air passages 13. Moreover, the heater wire 33 is formed to have a width equal to the air passage holes 21 on the surface skin 20, or greater than the air passage holes 21, and is arranged over a substantially identical range with respect to the air passage holes 21. Arrangement of the heater wire 33 is made at positions to at least partially vertically overlap the air passage holes 21. Further, the heater wire 33 is formed to have a width less than the through-holes 32 on the seat base material 31, and is arranged in a smaller range in comparison with the through-holes 32. Arrangement of the heater wire 33 is made at a position to at least partially vertically overlap the through-holes 32. With the configuration as described above, air delivered from the air conditioning device through the air passages 13 and the through-holes 32 can be utilized, and thereby the temperature of heat generated by the heater wire 33 can be adjusted. Moreover, air can pass because the heater wire 33 does not plug the through-holes 32.

Figure 4:
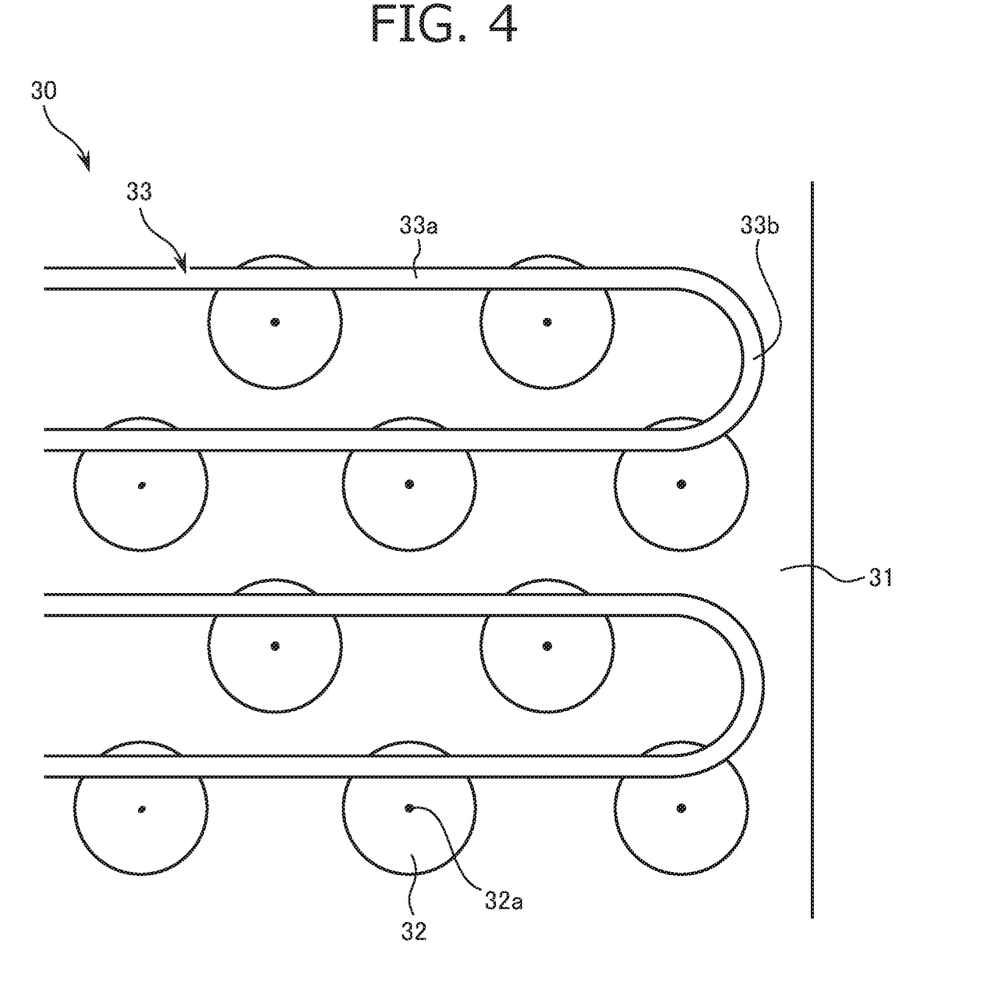
FIG. 4 is a partial, enlarged view of the seat heater of FIG. 3, according to an embodiment.

Next, a positional relationship between the heater wire 33 and the through-holes 32 on the seat base material 31 is described in detail with reference to FIG. 4. As illustrated in FIG. 4, the heater wire 33 includes a straight line portion 33a that linearly extends and a bent portion 33b that is bent continuously from the straight line portion 33a into a direction intersecting with respect to an extension direction of the straight line portion 33a.

The straight line portion 33a of the heater wire 33 is disposed at a position to at least partially overlap the through-holes 32 on the seat base material 31 and extends while avoiding center portions 32a of these through-holes 32. The bent portion 33b is disposed at a position to avoid the through-holes 32 on the seat base material 31. In other words, in the heater wire 33, only the straight line portion 33a is disposed at a position to overlap the through-holes 32. With the configuration as described above, in the heater wire 33, the straight line portion 33a that is comparatively difficult to deform is disposed to overlap the through-holes 32, while the bent portion 33b that is comparatively easy to deform is disposed at a position to avoid the through-holes 32, whereby deformation of the heater wire 33 can be further reduced. Note that the heater wire 33 is desirably disposed to avoid center portions 32a of all the through-holes 32 in some embodiments, but is disposed to avoid the center portions 32a of at least some of the through-holes 32 in other embodiments, whereby deformation of the heater wire 33 can be reduced.

Moreover, as illustrated in FIG. 4, the straight line portion 33a of the heater wire 33 is disposed to extend in the seat right and left direction in such a manner as to extend over the through-holes 32 while avoiding the center portions 32a of the through-holes 32. Thus, in comparison with a case in which the heater wire 33 is disposed in such a manner as to overlap along outer circumferential portions of the through-holes 32, overlapping areas of the heater wire 33 and the through-holes 32 can be enlarged. As a result, air delivered from the air conditioning device is facilitated to be applied to the heater wire, and adjustment of the temperature of heat generated by the heater wire is facilitated.

Next, a second embodiment of a seat heater 130 is described with reference to FIGS. 5 and 6. Note that, in the below description, description of elements similar to those of the seat heater 30 is omitted. In comparison with the seat heater 30, the seat heater 130 according to the second embodiment includes through-holes 132 having an elongated hole shape, and a positional relationship between a heater wire 133 and the through-holes 132 on a seat base material 131 is different.

Figure 5:
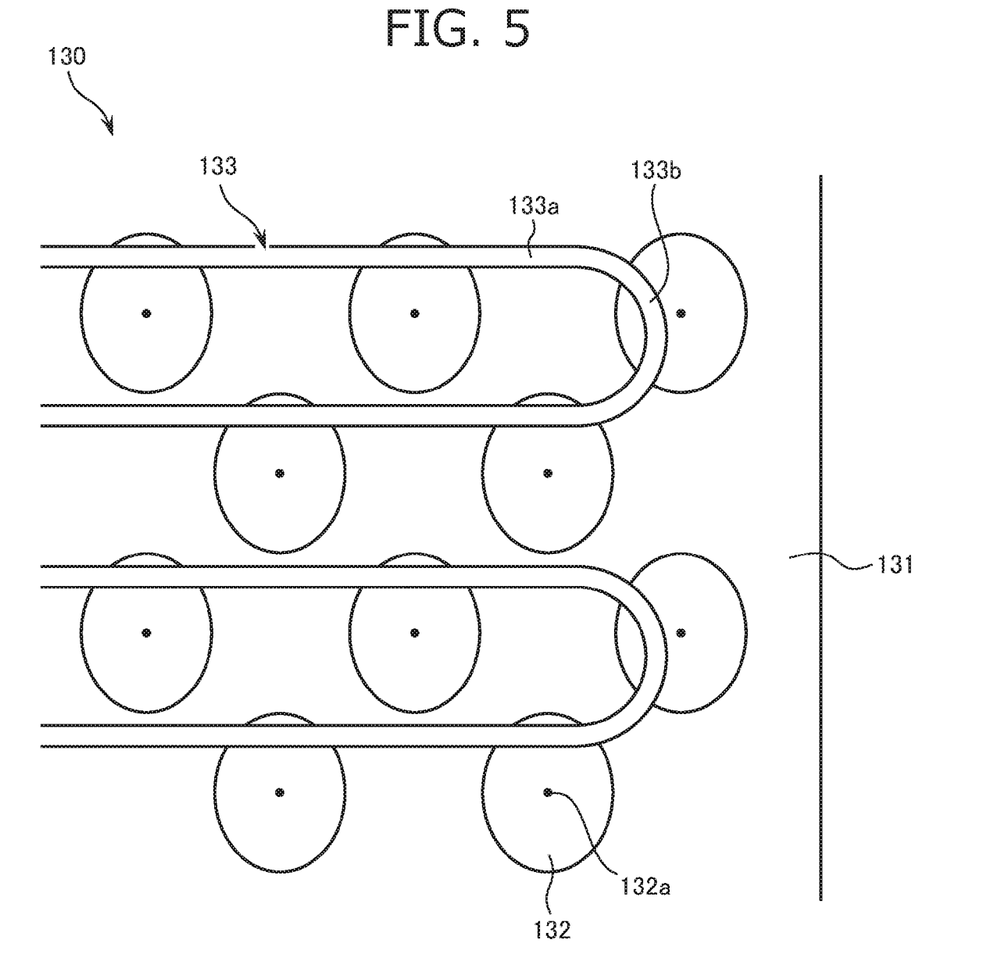
FIG. 5 is a partial, enlarged view of a seat heater, according to another embodiment.

As illustrated in FIG. 5, the heater wire 133 includes a straight line portion 133a and a bent portion 133b that is bent, continuously from the straight line portion 133a, with respect to an extension direction of the straight line portion 133a.

The straight line portion 133a of the heater wire 133 extends in a direction substantially orthogonal to a longitudinal direction of the through-holes 132 on the seat base material 131, and is disposed at a position to at least partially vertically overlap the through-holes 132. The bent portion 133b is disposed at a position to at least partially vertically overlap the through-holes 132 on the seat base material 131.

Figure 6:
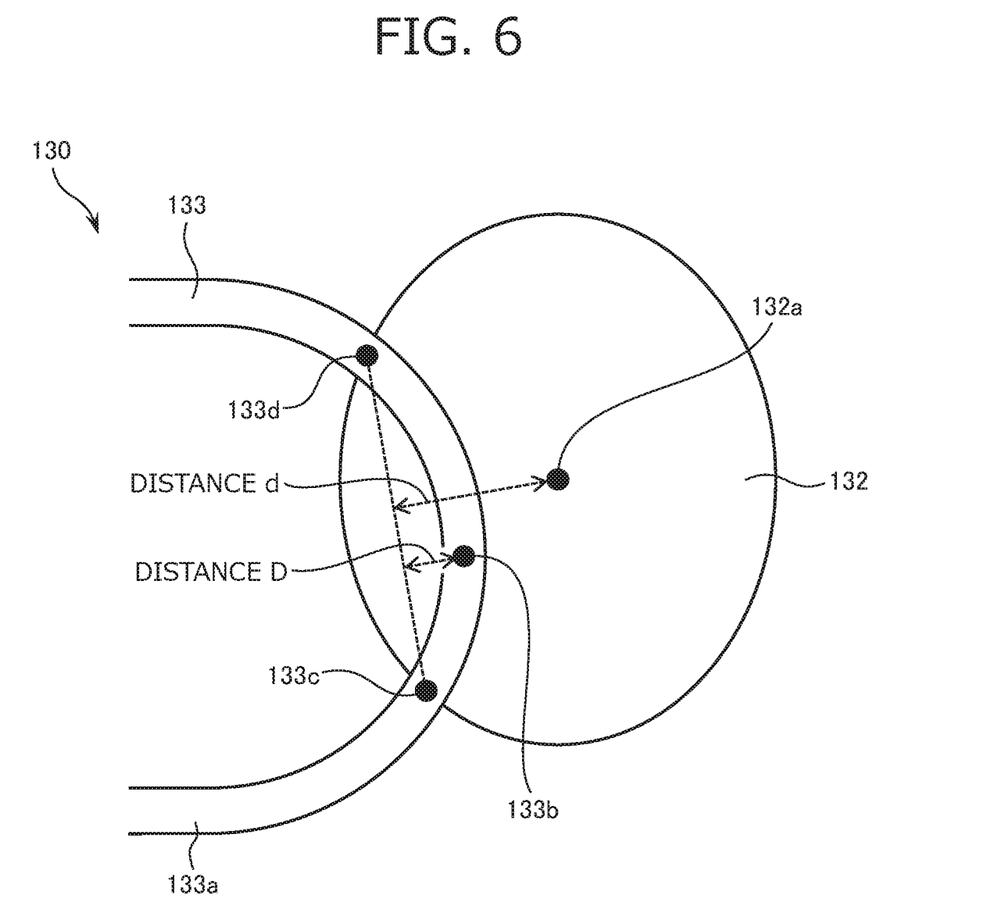
FIG. 6 is a partial, enlarged view of the seat heater, according to yet another embodiment.

In an embodiment, as illustrated in FIG. 6, the heater wire 133 is disposed in such a manner as to extend over the through-holes 132. Positions at which an outer circumferential portion of the through-hole 132 is overlapped are referred to herein as a first overlapping portion 133c and a second overlapping portion 133d. The bent portion 133b is bent between the first overlapping portion 133c and the second overlapping portion 133d, and vertically overlaps the through-hole 132. In this embodiment, a distance D of a perpendicular line from the bent portion 133b with respect to an extension line of a straight line that connects the first overlapping portion 133c and the second overlapping portion 133d is shorter than a distance d of a perpendicular line from a center portion 132a of the through-hole 132 with respect to the extension line. With the configuration as described above, even in a case in which the bent portion 133b is disposed to vertically overlap the through-holes 132, an overlapping portion of the bent portion 133b and the periphery of the bent portion 133b and the through-holes 132 is as small as possible, whereby deformation of the heater wire 133 can be further reduced.

In the embodiments as described above, the air passages 13 of the cushion pad 10 extend from the top surface side to the bottom surface side in the vertical direction, and may extend in an intersection direction with respect to a seating surface of the cushion pad 10. Moreover, the air passages 13 are formed over the entirety of the seating surfaces of the front pad 10*a* supporting the thighs of the seated occupant and of the center pad 10*b* supporting the buttocks of the occupant, and, for example, may be formed in the front pad 10*a* only, but arrangement of the air passages 13 may be modified, as appropriate.

In the embodiments as described above, the air passage holes 21 of the surface skin 20 extend from the top surface side to the bottom surface side in the vertical direction, and may extend in an intersection direction with respect to a seating surface of the surface skin 20. For example, if the air passage holes 21 are formed in such a manner as to slant in a seat inner side direction from the bottom surface side toward the top surface side, air can be efficiently concentrated and delivered toward the seated occupant, and comfort for the occupant improves.

In the embodiments as described above, the seat base material 31 of the seat heater 30 is made of a non-woven fabric that has a plurality of through-holes 32 and is generally air permeable, but modification, such as use of a seat base material made of a mesh structure, may be performed in other embodiments, as appropriate.

In the embodiments as described above, the through-holes 32 extend from the top surface side to the bottom surface side in the vertical direction, and may extend in an intersection direction with respect to a seating surface of the seat heater 30. Moreover, the through-holes 32 are substantially circular shaped in the horizontal cross section, but modification of shape, such as using a substantially elliptical shape in the cross section, and substantially polygonal shape in the cross section, may be performed in other embodiments, as appropriate.

In the embodiments as described above, the heater wire 33 extends while winding substantially in parallel in the seat front to back direction to be fixed on the seat base material 31, but disposition of the heater wire 33 may be freely modified, in other embodiments. Moreover, the heater wire 33 is fixed and bonded on the seat base material 31 through an adhesive agent, but, for example, modification, such as the heater wire 33 woven in the interior of the seat base material 31, may be performed in other embodiments, as appropriate. Moreover, the heater wire 133 has an elongated hole shape, and is disposed to extend in a direction substantially orthogonal to the longitudinal direction of the through-holes 132, and, for example, may extend in a direction intersecting the longitudinal direction of the through-holes 132, and may extend to form an acute angle with respect to the longitudinal direction of the through-holes 132, but modification may be performed in other embodiments, as appropriate.

In the embodiments as described above, as illustrated in FIG. 4, the heater wire 33 is disposed to extend in the seat right and left direction in such a manner as to extend over the through-holes 32 while avoiding the center portions 32*a* of the through-holes 32, but, as long as the center portions 32*a* of the through-holes 32 are avoided, modification may be performed in other embodiments, as appropriate. For example, the heater wire 33 is disposed in such a manner as to overlap along the outer circumferential portions of the through-holes 32, whereby overlapping areas of the heater wire 33 and the through-holes 32 can be as small as possible, and deformation of the heater wire 133 can be reduced.

In the embodiments as described above, the heater wire 33 is disposed at a position to at least partially vertically overlap the air passages 13 on the cushion pad 10, and, in this case, extends to avoid center portions of the air passages 13. In this configuration, in a positional relationship between the heater wire 33 and the air passages 13, the heater wire 33 can avoid the center portions of the air passages 13 that are positions at which the heater wire 33 most easily sinks when a seating load of the occupant is applied, whereby deformation of the heater wire can be further reduced.

In the embodiments as described above, a vehicle seat that is used for the automobile has been described as a specific example, but may be used as a vehicle seat for a train, a bus, or the like as well as a conveyance seat for an aircraft, a ship, or the like, in other embodiments.

In the present disclosure, the vehicle seat S according to various embodiments has been described. However, the embodiments as described above are merely examples for facilitating understanding of the invention and are not intended to limit the invention. It shall be apparent that the invention may be modified or improved without departing from the scope thereof, and that the present invention includes equivalents thereof. Particularly, the shape, disposition, and configuration of the seat heater 30 including the seat base material 31, the through-holes 32, and the heater wire 33 that have been described in the embodiments as described above are merely examples and are not intended to limit the invention.

TABLE OF REFERENCE NUMERALS

S: vehicle seat
1: seat cushion
2: seat back
    2a, 3a: cushion pad
    2b, 3b: surface skin
3: head rest
10: cushion pad
    10a: front pad
    10b: center pad
    10c: back pad
11, 12: pad groove
13: air passage
20: surface skin
    20a, 20b, 20c: surface skin
21: air passage hole
22: wadding member
30, 130: seat heater
31, 131: seat base material
    31a: front planar element
    31b: center planar element
    31c: back planar element
    31d, 31e: connection planar element
32, 132: through-hole
    32a, 132a: center portion
33, 133: heater wire
    33a, 133a: straight line portion
    33b, 133b: bent portion
    133c: first overlapping portion
    133d: second overlapping portion
34: connector

The invention claimed is:

1. A vehicle seat comprising:
a cushion pad;
a surface skin that covers the cushion pad; and
a seat heater disposed between the cushion pad and the surface skin;
wherein the vehicle seat is configured to allow air to be delivered from a side of the cushion pad toward a side of the surface skin through an air passage formed in the cushion pad, wherein the seat heater comprises a seat base material that comprises a planar element, and a heater wire fixed to the seat base material, wherein the seat base material has a plurality of through-holes, wherein the through-holes of the plurality of through-holes extend from a first surface side to a second surface side opposite the first surface side, are formed to have a width less than the air passage, and are formed to have a width greater than the heater wire, and wherein the heater wire is disposed at a position to partially overlap the air passage on the cushion pad, and is disposed at a position to partially overlap the plurality of through-holes on the seat base material and is disposed at a position to avoid center portions of the through-holes, wherein the heater wire comprises a straight line portion that extends linearly, and wherein only the straight line portion is disposed at a position to overlap at least one of the through-holes on the seat base material.

2. The vehicle seat according to claim 1, wherein the through-holes comprise elongated holes, and wherein the heater wire extends in a direction intersecting a longitudinal direction of the through-holes on the seat base material.

3. The vehicle seat according to claim 2, wherein the heater wire extends in a direction orthogonal to the longitudinal direction of the through-holes on the seat base material.

4. The vehicle seat according to claim 2, wherein the heater wire extends to form an acute angle with respect to the longitudinal direction of the through-holes on the seat base material.

5. The vehicle seat according to claim 1, wherein the heater wire comprises a bent portion that is bent, and wherein the bent portion is disposed at a position to avoid the through-holes on the seat base material.

6. The vehicle seat according to claim 1, wherein the heater wire is disposed to extend over at least one of the through-holes on the seat base material, and comprises a first overlapping portion and a second overlapping portion that are provided at positions to overlap an outer circumferential portion of the through-holes, and a bent portion provided at a position to overlap the through-holes and bent between the first overlapping portion and the second overlapping portion, and a distance of a perpendicular line from the bent portion with respect to an extension line of a straight line that connects the first overlapping portion and the second overlapping portion is shorter than a distance of a perpendicular line from a center portion of the through-holes with respect to the extension line.

7. A vehicle seat comprising:

a cushion pad;

a surface skin that covers the cushion pad; and a seat heater disposed between the cushion pad and the surface skin;

wherein the vehicle seat is configured to allow air to be delivered from a side of the cushion pad toward a side of the surface skin through an air passage formed in the cushion pad, wherein the seat heater comprises a seat base material that comprises a planar element, and a heater wire fixed to the seat base material, wherein the seat base material has a plurality of through-holes, wherein the through-holes of the plurality of through-holes extend from a first surface side to a second surface side opposite the first surface side, are formed to have a width less than the air passage, and are formed to have a width greater than the heater wire, and wherein the heater wire is disposed at a position to partially overlap the air passage on the cushion pad, and is disposed at a position to partially overlap the plurality of through-holes on the seat base material and is disposed at a position to avoid center portions of the through-holes, wherein the heater wire is disposed to extend over at least one of the through-holes on the seat base material, and comprises a first overlapping portion and a second overlapping portion that are provided at positions to overlap an outer circumferential portion of the through-holes, and a bent portion provided at a position to overlap the through-holes and bent between the first overlapping portion and the second overlapping portion, and a distance of a perpendicular line from the bent portion with respect to an extension line of a straight line that connects the first overlapping portion and the second overlapping portion is shorter than a distance of a perpendicular line from a center portion of the through-holes with respect to the extension line.

* * * * *